United States Patent [19]
Mohri et al.

[11] Patent Number: 5,646,078
[45] Date of Patent: Jul. 8, 1997

[54] ALUMINUM NITRIDE POWDER

[75] Inventors: Masahide Mohri; Shinichiro Tanaka, both of Ibaraki; Takeshi Miyai, Chiba, all of Japan

[73] Assignee: Sumitomo Chemical Company, Limited, Osaka, Japan

[21] Appl. No.: 501,580

[22] Filed: Jul. 12, 1995

[30] Foreign Application Priority Data

Jul. 12, 1994 [JP] Japan .................................... 6-184093

[51] Int. Cl.$^6$ ................................................ C04B 35/581
[52] U.S. Cl. ............................................ 501/98; 423/412
[58] Field of Search ......................... 501/96, 98; 423/412

[56] References Cited

U.S. PATENT DOCUMENTS

| | | | |
|---|---|---|---|
| 4,618,592 | 10/1986 | Kuramoto et al. | 501/96 |
| 4,869,925 | 9/1989 | Hiai et al. | 501/96 |
| 5,049,367 | 9/1991 | Nakano et al. | 423/412 |
| 5,154,907 | 10/1992 | Kim et al. | 423/412 |
| 5,182,239 | 1/1993 | Hirokawa et al. | 501/96 |
| 5,219,804 | 6/1993 | Weimer et al. | 501/96 |
| 5,246,683 | 9/1993 | Parent et al. | 501/96 |
| 5,344,635 | 9/1994 | Bujard et al. | 423/412 |

FOREIGN PATENT DOCUMENTS

| | | |
|---|---|---|
| 0372691 | 5/1989 | European Pat. Off. . |
| 0555184 | 1/1993 | European Pat. Off. . |
| 0644278 | 9/1993 | European Pat. Off. . |
| 0644279 | 9/1993 | European Pat. Off. . |
| 3-23206 | 1/1991 | Japan . |
| 4-74705 | 3/1992 | Japan . |

OTHER PUBLICATIONS

Huseby, Journal of the American Ceramic Society, (1983) 66:217-220 Mar.

Forslund et al., Journal of Materials Science 28 (1993) 3132-3136 Jun.

Tsuge et al., Journal of Materials Science 25 (1990) 5:2359-2361 May.

*Primary Examiner*—Karl Group
*Assistant Examiner*—Louis M. Troilo
*Attorney, Agent, or Firm*—Birch, Stewart, Kolasch & Birch, LLP

[57] ABSTRACT

An aluminum nitride powder comprising polycrystalline particles which have clearly observed grain boundaries, an agglomerated particle size of 0.1 to 100 μm when measured by a particle size distribution analyzer, a tapped bulk density of 0.55 to 2.0 g/cm$^3$, and a ratio of a number average particle size calculated from a SEM photograph image to a particle size calculated from a BET specific surface area of 1.1 to 3.

2 Claims, 1 Drawing Sheet

5,646,078

ALUMINUM NITRIDE POWDER

BACKGROUND OF THE INVENTION

1. Field of the Invention

The present invention relates to an aluminum nitride powder.

2. Description of the Related Art

Since aluminum nitride is excellent in electrical insulation and has a high thermal conductivity, it is expected as a high thermal conductive material which is used as, for example, a raw material of a sintered body or a filler to be added to a resin and so on.

In particular, in the electronics field, with the increase of an integration degree of IC and an output of a power transistor, it is desired to effectively dissipate heat generated in a semiconductor device. Then, the application of an aluminum nitride material having a high thermal conductivity is highly expected.

A conventional aluminum nitride powder consists of particles grain boundaries of which are not clearly observed in a SEM (scanning electron microscope) photograph.

When such aluminum nitride powder is used in the production of a sintered body, the small particle powder is easily sintered, but the smaller particles are more greatly influenced by the van der Waals' force and strongly agglomerated, so that the powder becomes bulky and its handling is difficult. In addition, a density of a molded article before sintering decreases, and then the shrinkage after sintering increases. When a powder of large particles is used, its handling is easy and a density of the molded article increases, but its sintering is difficult.

When the aluminum nitride is added to a resin and used as a filler therein, since the conventional aluminum nitride powder has smooth particle surfaces, adhesion between the particles and the resin is insufficient. On the other hand, when the particle surfaces have unevenness, since they have voids, the resin hardly reaches their insides deeply, whereby some defects are caused. If the adhesion between the resin and the particles is insufficient, moisture absorbed from an air induces peeling off of an adhered interface, or moisture penetrates in a space formed by such peeling off so that an amount of absorbed water increases and then the aluminum nitride particles may be deteriorated.

With the aluminum nitride powder which can be used as a filler in a resin, many investigations have been made.

For example, Japanese Patent KOKAI Publication No. 23206/1991 discloses an aluminum nitride powder with a uniform single particle size which comprises particles having an average single particle size of at least 3 μm each of which has a rounded shape and contains substantially no spinel aluminum oxynitride. This Publication includes a photograph of the aluminum nitride powder in FIG. 1, but the particle surfaces are smooth. When the particle surfaces are smooth, an anchoring effect due to unevenness of the particle surfaces cannot be expected, and therefore, the adhesion between the matrix resin and the particles is insufficient.

Japanese Patent KOKAI Publication No. 74705/1992 discloses spherical aluminum nitride particles having an average particle size of 7 to 300 μm and a ratio of a longer axis to a shorter axis of 1.5 or less. This Publication includes a photograph of the aluminum nitride powder in FIG. 1. The powder comprises particles having deep holes. When the particles have the deep holes, the resin does not penetrate deeply into the holes, whereby some defects are caused.

SUMMARY OF THE INVENTION

An object of the present invention is to provide a novel aluminum nitride powder which is easily sintered and handled to provide a sintered body having a high thermal conductivity.

Another object of the present invention is to provide a novel aluminum nitride powder, particle surfaces of which have adequate unevenness such that it has an anchoring effect in a resin matrix but does not form a hole.

According to the present invention, there is provided an aluminum nitride powder comprising polycrystalline particles which have clearly observed grain boundaries, an agglomerated particle size of 0.1 to 100 μm when measured by a particle size distribution analyzer, a tapped bulk density of 0.55 to 2.0 g/cm$^3$, and a ratio of a number average particle size calculated from a SEM photograph image to a particle size calculated from a BET specific surface area of 1.1 to 3.

BRIEF DESCRIPTION OF THE DRAWING

The FIGURE is a scanning electron microscopic photograph of the aluminum nitride powder obtained in Example 2 (magnification: 8800 times).

DETAILED DESCRIPTION OF THE INVENTION

Figure 1:
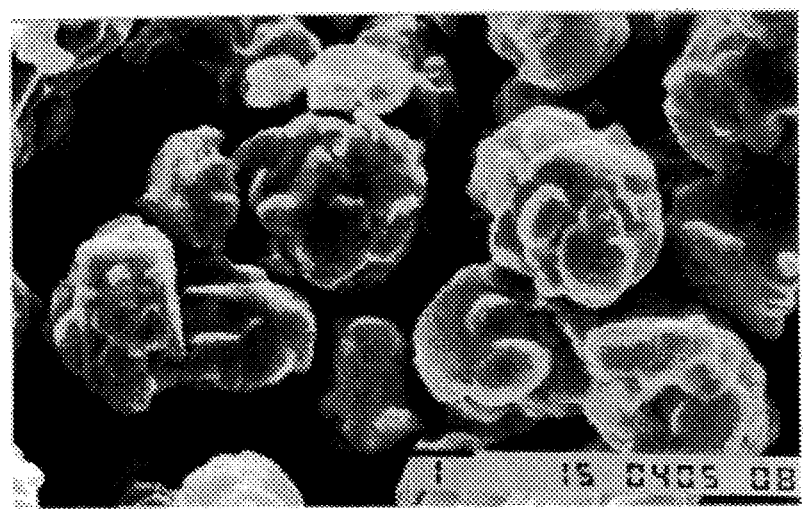

The particles of the aluminum nitride powder of the present invention are polycrystalline particles which have clearly observed grain boundaries.

When the aluminum nitride powder of the present invention is used in the production of the sintered body, since the crystal which is separated by the grain boundary is sintered as the minimum unit, the powder is easily sintered. During handing, since the whole particle as the polycrystal functions as the minimum unit, the powder is easily handled.

That is, with the aluminum nitride powder of the present invention, the minimum unit in handling is larger than the minimum unit in sintering, and the tapped bulk density of the powder is at least 0.55 g/cm$^3$. Therefore, the powder is easily handled and sintered.

While it is possible to achieve the tapped bulk density of at least 0.55 g/cm$^3$ by forming particles having fractured faces by grinding, an oxygen content in the aluminum nitride powder is increased by grinding, or minute particles are formed, whereby the powder is irregularly sintered. Then, the aluminum nitride powder having the fractured faces is unsuitable as the sintering powder.

Since the aluminum nitride powder of the present invention comprises polycrystalline particles and has clearly observed grain boundaries and unevenness at the grain boundaries on the particle surfaces, it has a larger surface area than the particles having smooth surfaces. Further, the number average particle size calculated from the SEM photograph image is larger than the particle size calculated from the BET specific surface area, and the ratio of the former particle size to the latter particle size is from 1.1 to 3.

If the above ratio is less than 1.1, the adhesion between the particle surfaces and the resin is insufficient since the particle surfaces become smooth and then the amount of absorbed water in a composite increases, when the powder is added to the resin as the filler.

If the above ratio exceeds 3, since the particles have deep holes, the resin hardly penetrates deep into the holes, whereby some defects may be caused, when the powder is used as the filler in the resin. When the powder having such large ratio is used in the production of the sintered body, the particles are strongly agglomerated, and a density of the sintered body is rather low.

Since the aluminum nitride powder in which the grain boundary is not clearly observed has smooth particle surfaces, the adhesion between the particles and the resin may be insufficient when the powder is used as the filler in the resin. Therefore, such powder is not suitable as the filler. If the particles are polycrystal but porous, the resin hardly penetrates deep into the pores, whereby some defects may be caused.

Accordingly, the aluminum nitride powder of the present invention which comprises the polycrystalline particles and has clearly observed grain boundaries is suitable as the sintering material or as the filler, since it has adequate unevenness on the particle surfaces.

The aluminum nitride powder of the present invention has an agglomerated particle size of 0.1 to 100 μm when measured by a particle size distribution analyzer, and a tapped bulk density of 0.55 to 2.0 g/cm$^3$. The larger tapped bulk density is better. But, it is rather difficult to made the tapped bulk density larger than 2.0 g/cm$^3$.

The agglomerated particle size should be at least 0.1 μm and is preferably at least 0.5 μm, since the smaller particles are easily oxidized and cannot be stored for a long time. When the agglomerated particle size is less than 0.1 μm, the tapped bulk density may be smaller than 0.55 g/cm$^3$. Therefore, the handling of the powder prior to sintering is difficult, when the powder is used as the sintering material. When the powder having the small agglomerated particle size is used as the filler, an amount of the powder which can be added to the resin as the filler is decreased.

The agglomerated particle size of the powder should not exceed 100 μm, and is preferably 50 μm or less. For the production of the sintered body, the agglomerated particle size is preferably 5 μm or less, more preferably 3 μm or less. If the agglomerated particle size exceeds 100 μm, a density of the sintered body is low when the powder is used as the sintering material, or a molded article of the resin containing the aluminum nitride powder tends to have unevenness on the article surface when the powder is used as the filler.

The aluminum nitride powder of the present invention can be produced by any of conventional methods, for example, a reduction nitriding method comprising heating an alumina powder in an atmosphere containing nitrogen in the presence of a reducing agent such as carbon, a direct nitriding method comprising heating an aluminum powder in an atmosphere containing nitrogen, a gas phase synthesis method comprising heating aluminum chloride in an atmosphere containing nitrogen, and so on. Among them, the reduction nitriding method is preferred.

Hereinafter, the production of the aluminum nitride powder by the reduction nitriding method will be explained.

One of typical examples of raw materials used in the production of the aluminum nitride powder of the present invention is an alumina powder comprising α-alumina particles which have polyhedral shapes with at least 8 faces, are the hexagonal close-packed lattice, and have a D/H ratio of 0.5 to 3.0 where D is a maximum particle size in a direction parallel to a hexagonal lattice plane, and H is a particle size in a direction perpendicular to the hexagonal lattice plane.

Using such alumina powder, the aluminum nitride powder of the present invention is readily produced.

When the raw material alumina powder is the above alumina powder, the aluminum nitride powder produced by the reduction nitriding method has the increased BET specific surface area, since it has the clear grain boundaries and unevenness on the particle surfaces. Accordingly, the BET specific surface area of the produced aluminum nitride powder is larger than that of the raw material alumina powder. Therefore, the alumina powder comprising the α-alumina particles having the above properties is preferably used as the raw material.

If the BET specific surface area of the aluminum nitride powder is not larger than that of the raw material alumina powder, the aluminum nitride powder does not have clear grain boundaries. For example, if alumina particles whose shapes are not polyhedral and have fractured faces are used as the raw material, the aluminum nitride of the present invention cannot be obtained since no clear grain boundary is formed.

When the aluminum nitride powder of the present invention is used as the sintering material, it is easily sintered and handled and provides the sintered body having the high thermal conductivity. When it is used as the filler to be added to a matrix such as the resin, the adhesion between the powder particles and the matrix is good since the powder particles have adequate unevenness which has the anchoring effect but does not cause pores.

The aluminum nitride powder of the present invention can be sintered by a conventional method. When a sintering aid is used, yttrium oxide, calcium oxide and/or an oxide of a rare earth element can be added in an amount of 0.1 to 10 wt. % based on the weight of the aluminum nitride powder.

When a binder is used, a conventionally used binder resin such as an acrylic resin or polyvinyl butyral is used in an amount of 0.1 to 10 wt. parts per 100 wt. parts of the aluminum nitride powder.

When a plasticizer is used, a conventionally used plasticizer such as dioctyl phthalate or dibutyl phthalate is used in an amount of 0.1 to 10 wt. parts per 100 wt. parts of the aluminum nitride powder.

The aluminum nitride powder, the sintering aid, the binder and the plasticizer can be mixed using a conventional mixing apparatus such as a ball mill, a vibration mill, an attriter, a kneader, etc. During mixing, a solvent such as ethanol, methanol, butanol, toluene, acetone, methyl ethyl ketone, and the like may be used.

A mixture of the aluminum nitride powder, the sintering aid, the binder and other ingredients is dried and shaped by a unidirectional press, a rubber press, and the like. Alternatively, a dispersion of the aluminum nitride powder, the sintering aid, the binder and other ingredients in the solvent is shaped with a doctor blade or a calender roll.

The sintering is carried out in an atmosphere of an inert gas such as nitrogen or argon under pressure of 1 to 10 atm., or by hot pressing under pressure of 100 to 2000 kg/cm$^2$ or hot isostatic pressing under pressure of 100 to 3000 kg/cm$^2$.

A sintering temperature is preferably from 1600° to 2000° C. When the sintering temperature is lower than 1600° C., the density of the sintered body is less than 90% of the theoretical density, and a dense sintered body may not be obtained. When the sintering temperature is higher than 2000° C., color shading may appear on the sintered body.

When the aluminum nitride powder of the present invention is compounded as a filler in a matrix such as a resin and the like by a conventional method, a composite material can be prepared.

A kind of the matrix is not limited. For example, the aluminum nitride powder of the present invention can be added to a resin such as an epoxy resin, a phenol resin, a polyimide resin, a polypropylene resin, a polyester resin, a silicone resin, etc. or a rubber such as a silicone rubber. The compound may contain a conventional additive such as a curing agent, a plasticizer, a colorant, a stabilizer, a mold release agent, etc.

To add the aluminum nitride powder of the present invention to the resin and so on, the powder, the resin and the optional additive are kneaded by, for example, rolls, a kneader, a laboplasto mill, etc.

An amount of the aluminum nitride powder to be added is preferably from 20 to 80 vol. % of the resin. When the amount of the powder is less than 20 vol. %, the thermal conductivity may not be effectively increased. When the powder is added in an amount exceeding 80 vol. %, the relative volume of the resin is too small, so that voids may form in the molded article. The compound can be molded by any conventional molding method such as casting, transfer molding, press molding, injection molding and the like.

EXAMPLES

The present invention will be illustrated by the following Examples, which will not limit the present invention in any way.

In the Examples, the properties are measured as follows:
1) Number average particle size and D/H Using a SEM (T-300 manufactured by NIPPON DENSHI Co., Ltd.), an electron microscopic photograph of powder particles is taken. From the photograph, 5 to 10 particles are selected and image analyzed to measure particles sizes, and they are averaged. Also, a D/H ratio is calculated. Hereinafter, the number average particle size will be referred to as "particle size" simply.

2) Weight average agglomerated particle size

With an alumina powder, a weight average agglomeration particle size is measured by a laser diffraction scattering method using a master sizer (manufactured by Malvern Instrument Inc.). Hereinafter, the weight average agglomeration particle size will be referred to as "agglomerated particle size" simply.

As a pretreatment for the measurement, the alumina powder is added to water containing 0.15 wt. % of dissolved sodium hexametaphosphoric acid as a dispersant, and dispersed by irradiating ultrasonic wave with an ultrasonic homogenizer for 2 minutes.

With an aluminum nitride powder, the agglomerated particle size is measured by a centrifugal sedimentation method using SA-CP2 (manufactured by Shimadzu Corporation).

As a pretreatment for the measurement, the aluminum nitride powder is added to ethanol containing 0.02 wt. % of dissolved CERAMO D-18 (manufactured by DAIICHI KOGYO SEIYAKU Co., Ltd.) as a dispersant, and dispersed by irradiating ultrasonic wave with an ultrasonic cleaner for 10 minutes.

3) Crystal phase

A crystal phase is measured by an X-ray diffraction method with RAD-C (manufactured by KABUSHIKIKAI-SHA RIGAKU).

4) Singly crystal

Powder particles are observed using a transmission electron microscope (J-4000 manufactured by NIPPON DENSHI Co., Ltd.)

5) BET specific surface area

A BET specific surface area is measured using FLOWSORB-II (manufactured by Micromelitics).

6) Particle size calculated from BET specific surface area

This particle size is calculated according to the following equation:

Particle size=6/[(BET specific surface area)×(density)]

with the density of aluminum nitride being 3.26 g/cm$^3$.

7) Tapped bulk density

An aluminum nitride powder (about 200 ml) is charged in a measuring cylinder without vibrating the cylinder or pressing the powder. Then, the measuring cylinder is dropped 100 times from the height of 3 cm, and then a volume of the aluminum nitride powder is read from a scale on the measuring cylinder wall. Then, the weight of the aluminum nitride powder charged in the measuring cylinder is divided by the measured volume to obtain a tapped bulk density.

EXAMPLE 1

Aluminum hydroxide (AKP-DA (trade name) manufactured by Sumitomo Chemical Co., Ltd.) was dispersed in water to form a slurry, and the slurry was dried and calcined to obtain alumina.

To the obtained alumina (100 wt. parts), α-alumina powder (AKP-30 (trade name) manufactured by Sumitomo Chemical Co., Ltd. having a particle size of 0.5 μm) (0.1 wt. part) was added and the mixture was dried to obtain a raw material.

The raw material (1 kg) was charged in a quartz muffle with closing one end and placed in a furnace kept at 1100° C. for 30 minutes. Then, to an open end of the quartz muffle, a lid having a gas inlet tube and an exhaust tube was attached, and an atmosphere gas consisting of 30 vol. % of hydrogen chloride gas and 70 vol. % of nitrogen was flowed at a flow rate of 200 ml/min. for one hour. Thereafter, the powder was removed from the furnace and spontaneously cooled.

The obtained powder was analyzed by X-ray diffraction to find that the powder was the α-alumina powder and no other peak was observed.

According to the results of the observation by the scanning electron microscope, polyhedral particles each having 8 to 10 faces were formed, and substantially no fractured face was found.

The particle size was 1.5 μm, and the D/H ratio was 1.0.

The agglomerated particle size was 3.2 μm, and the BET specific surface area was 1.2 m$^2$/g.

By the observation of the powder particles with the transmission electron microscope, no grain boundary was found, and the particle was a single crystal particle.

The obtained powder consisting of the polyhedral alumina particles (510 g) and carbon (acetylene black manufactured by DENKIKAGAKU KOGYO Co., Ltd.) (240 g) were mixed in a ball mill. As a dispersion medium, a liquid comprising water (1800 g) in which NEUGEN EA-137 (manufactured by DAIICHI KOGYO SEIYAKU Co., Ltd.) (28.8 g), polyethylene glycol (#1000, manufactured by WAKO JUNYAKU KOGYO Co., Ltd.) (7.5 g), aluminum nitrate [Al(NO$_3$)$_3$.9H$_2$O] (4.49 g) and 1N nitric acid (18 g) were dissolved was used. After mixing them in the ball mill for 16 hours, the mixture was dried at 110° C. in a drier, charged in a graphite tray at a thickness of 15 mm, and calcined at 1650° C. in a nitrogen gas stream for 5 hours. The flow volume of the nitrogen gas was 0.38 m$^3$ (converted to a volume under a normal pressure at a normal temperature) per 1 kg of the mixture per one hour.

The obtained reaction product was calcined at 670° C. in an air for 2 hours to remove excessive carbon by burning.

The obtained aluminum nitride powder contained 1.01 wt. % of oxygen and had the tapped bulk density of 0.66 g/cm$^3$. The powder consisted of polycrystal particles having clearly observed grain boundary but substantially no fractured face. The particle size was 1.5 µm, the agglomerated particle size was 2.8 µm, and the BET specific surface was 1.9 m$^2$/g. The particle size calculated from the BET specific surface area was 0.97 µm. Then, the ratio of the particle size to the particle size calculated from the BET specific surface area was 1.5.

To the obtained aluminum nitride powder, 3 wt. % of a yttrium oxide powder as a sintering aid and 1 wt. % of an acrylic resin as a binder were added, and mixed using butanol in a ball mill.

After drying the mixed powder, the powder was shaped in a mold under pressure of 300 kg/cm$^2$ to obtain a cylindrical molded article having a diameter of 13 mm and a height of 10 mm. Then, the molded article was rubber pressed under a pressure of 1500 kg/cm$^2$. The obtained molded article was placed in a graphite vessel, embedded in a mixed powder of the aluminum nitride powder and a boron nitride powder in a weight ratio of 1:1, and sintered in a nitrogen atmosphere under a normal pressure at 1850° C. for 5 hours.

The density of the obtained sintered body was 3.29 g/cm$^3$ (100% of the theoretical value).

A thermal conductivity of the sintered body was 189 W/mK when measured by a laser flash method.

The above aluminum nitride powder having the agglomerated particle size of 2.8 µm was added to an epoxy resin (SUMIEPOXY ESCN-195-XL (trade name) manufactured by Sumitomo Chemical Co., Ltd.). To the mixture, a curing agent, a curing accelerator, a mold release agent and a coupling agent were added [phenolnovolak (TAMANORU 758 (trade name) manufactured by ARAKAWA CHEMICAL INDUSTRIES, LTD.) (54.3 parts by weight) as a curing agent, triphenylphosphine (manufactured by WAKO JUNYAKU KOGYO Co., Ltd.) (1.5 parts by weight) as a curing accelerator, carnauba wax (1.5 parts by weight) as a mold release agent and a coupling agent (SH-6040 (trade name) manufactured by Toray-Dow Corning Silicone) (2.0 parts by weight) were added relative to the epoxy resin (100 parts by weight)], so that the aluminum nitride powder occupied 50 vol. % of the whole mixture. Then, the mixture was kneaded on rolls at 110° C. The volume percentage was calculated with the densities of the aluminum nitride powder and the epoxy resin with additives after curing being 3.2 g/cm$^3$ and 1.2 g/cm$^3$, respectively.

The mixture was transfer molded in a disc shape and heated and cured at 180° C. to obtain a composite material.

The obtained composite material was kept standing in an atmosphere of 85% RH at 85° C. for 100 hours. Thereafter, an amount of absorbed water was measured to find that it was 0.51%.

EXAMPLE 2

In the same manner as in Example 1 except that the amount of AKP-30 was changed to 0.05 wt. part, an alumina powder consisting of polyhedral α-alumina particles having 8 to 12 faces but substantially no fractured face was prepared. The particle size was 2.5 µm and the D/H ratio was 1.0. The agglomerated particle size was 3.8 µm and the BET specific surface area was 0.7 m$^2$/g.

In the same manner as in Example 1 except that the above obtained alumina powder was used and the calcining time at 1650° C. was changed to 6 hours, an aluminum nitride powder was prepared. The obtained aluminum nitride had the oxygen content of 0.69 wt. % and the tapped bulk density of 0.62 g/cm$^3$, and consisted of polyhedral particles having the clearly observed grain boundary but substantially no fractured face. The particle size was 2.5 µm, the agglomerated particle size was 4.1 µm, and the BET specific surface area was 1.5 m$^2$/g. The particle size calculated from the BET specific surface area was 1.2 µm. Then, the ratio of the particle size to the particle size calculated from the BET specific surface area was 2.1.

The FIGURE is a scanning electron microscopic photograph of the aluminum nitride powder obtained in this Example (×8800).

In the same manner as in Example 1, the obtained aluminum nitride powder was added to the epoxy resin to obtain a composite material. An amount of absorbed water was measured in the same way as in Example 1 to find that it was 0.45%.

COMPARATIVE EXAMPLE

In the same manner as in Example 1 except that alumina (AMS-12 (trade name) manufactured by Sumitomo Chemical Co., Ltd. having a particle size of 0.3 µm, an agglomerated particle size of 0.6 µm, a BET specific surface area of 7.1 m$^2$/g, and a D/H ratio of 1.0) was used, and the reaction conditions were changed to a temperature of 1600° C. and a heating time of 5 hours, an aluminum nitride powder was prepared.

According to the observation with the scanning electron microscope, AMS-12 alumina consisted of particles having fractured faces. In the formed aluminum nitride particles, no clear grain boundary was observed.

The obtained aluminum nitride had the oxygen content of 1.10 wt. % and the tapped bulk density of 0.50 g/cm$^3$. The particle size was 0.5 µm, the agglomerated particle size was 1.9 µm, and the BET specific surface was 3.8 m$^2$/g. The particle size calculated from the BET specific surface area was 0.48 µm. Then, the ratio of the particle size to the particle size calculated from the BET specific surface area was 1.04.

In the same manner as in Example 1 except that the above comparative aluminum nitride powder was used, a sintered body was produced. The density of the sintered body was 3.24 g/cm$^3$ (98% of the theoretical value).

A thermal conductivity of the sintered body was 175 W/mK when measured by a laser flash method.

In the same manner as in Example 1, the obtained aluminum nitride powder was added to the epoxy resin to obtain a composite material. An amount of absorbed water was measured in the same way as in Example 1 to find that it was 1.06%.

What is claimed is:

1. An aluminum nitride powder comprising polycrystalline particles which have clearly observed grain boundaries, an agglomerated particle size of 0.5 to 100 µm when measured by a particle size distribution analyzer, a tapped bulk density of 0.55 to 2.0 g/cm$^3$, and a ratio of a number average particle size calculated from a SEM photograph image to a particle size calculated from a BET specific surface area of 1.1 to 3; provided that (1) said aluminum nitride powder is obtained by calcinating an alumina powder consisting essentially of α-alumina particles that have (i) polyhedral shapes with at least 8 faces and (ii) a D/H ratio of 0.5 to 0.3 where D is a maximum particle size in a direction parallel to a hexagonal lattice plane, and H is a particle size in a direction perpendicular to the hexagonal lattice plane, in an atmosphere containing nitrogen in the presence of a reducing agent, and (2) said aluminum nitride powder has a BET specific surface area larger than that of a raw material alumina powder.

2. The aluminum nitride powder according to claim 1, in which the polycrystaline particles have substantially no fractured face.

* * * * *